July 9, 1929.   L. VON OHLSEN   1,720,520
STORAGE BATTERY CHARGING SYSTEM
Filed Jan. 17, 1925
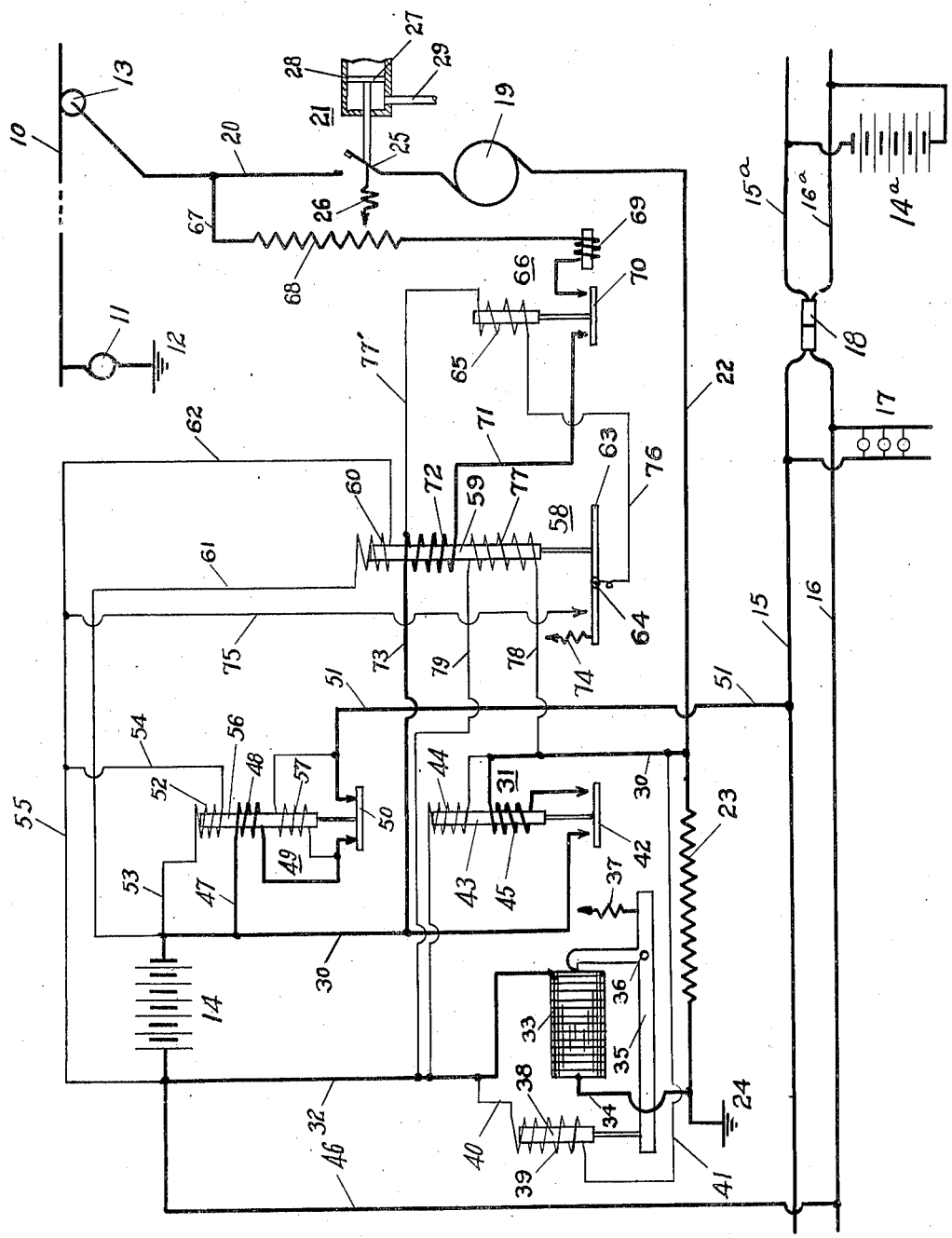
Louis Von Ohlsen INVENTOR.
By Robert S. Blair
ATTORNEY.

Patented July 9, 1929.

1,720,520

UNITED STATES PATENT OFFICE.

LOUIS VON OHLSEN, OF NEW HAVEN, CONNECTICUT, ASSIGNOR TO THE SAFETY CAR HEATING & LIGHTING COMPANY, A CORPORATION OF NEW JERSEY.

STORAGE-BATTERY-CHARGING SYSTEM.

Application filed January 17, 1925. Serial No. 2,984.

This invention relates to the charging of storage batteries, and particularly to the charging and protection of storage batteries such as are used, for example, for auxiliary purposes on electrically propelled vehicles for supplying energy to emergency or signal lights, for the remote or multiple unit control system of cars or trains, or for the primary illumination of the car or train, and the like.

One of the objects of this invention is to provide a thoroughly dependable and practical arrangement for maintaining the storage battery at the desired state of charge and for supplying the battery with charging current from the relatively high voltage power or transmission circuit efficiently, dependably and economically. More particularly, it is an object of this invention to provide a system and apparatus of the above nature in which the battery is effectively safeguarded against overcharge and in which the storage battery may be maintained in a proper state of charge throughout the various conditions of activity or inactivity of the vehicle or vehicles, and to which the latter are in practice subjected. Another object of this invention is to provide a system of the above character in which the battery will be dependably safeguarded against detrimental over-discharge and against receiving charging current from undesired or unintended sources of current. More specifically, this invention aims to provide a system whereby the above as well as other objects may be in practice carried out in a thoroughly reliable and dependable manner and whereby the varied conditions of hard practical use may be dependably met, and positiveness of automatic action and control achieved. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the single figure of the accompanying drawing there is diagrammatically shown a system illustrative of one of various possible embodiments of this invention.

As conducive to a clearer understanding of this invention, it might at this point be noted that electrically propelled vehicles particularly such as are used in subway or elevated transit service, and in which most if not all of the cars or units of the train are self-propelled, are provided with a storage battery for supplying energy to an emergency lamp circuit, to the circuits associated with the remote or multiple unit system of control, and for further example also to the train signal lights. This battery, however, is of relatively low voltage as compared with the voltage of the power or transmission circuit from which the vehicles or trains derive their motive power.

By way of example the storage battery embodied in the vehicle or in the cars of a train for purposes such as stated above may and preferably does take the form of a 16-cell battery in which case the average charging voltage may be considered to be in the neighborhood of forty volts. The power or transmission circuit, however, may have a voltage of, for example, 600 volts. A dominant aim of this invention is to provide a simple and thoroughly practical system in which such a storage battery may be effectively maintained in properly charged condition from such a high voltage source, but without sacrifice of economy of operation and simplicity of equipment and operation.

Referring now to the drawing, the transmission line, which may take any suitable form, is indicated at 10, this transmission line obtaining its energy from a suitable source of current 11, one side of which is grounded as at 12. A suitable current collecting device 13, which may take any desirable form, such as a shoe or trolley, is adapted to collect the energy from the transmission line 10 as the vehicle is in transit or at rest.

The storage battery 14 is connected to the "train line" indicated by the conductors 15 and 16, and from which emergency lamps or signal lamps indicated at 17 or other devices, such as the remote or multiple unit control devices, receive their energy. Train line conductors, such as the conductors 15—16, will be understood to extend through each vehicle or car of the train, and the "train line" may be completed by coupling the train line conductors of each car to those of a succeeding car. For illustration, there are diagrammatically indicated at 15ª and 16ª the train line conductors of a succeeding car or vehicle, coupled to the train line conductors 15—16 of the one car through any suitable coupling device, the latter being diagrammatically indicated at 18. The train line conductors 15ª and 16ª of an adjacent car will have connected to them in any suitable manner a storage battery diagrammatically indicated at 14ª.

Upon the vehicle are found various translating devices; these may take the form, for example, of the motor which drives the air compressor for the vehicle air brake system, or even one of the driving motors of the car. At 19 is indicated a motor, preferably the compressor motor, its circuit from the current collecting device 13 being completed through conductor 20, a pressure controlled switch generally indicated at 21, thence by way of conductor 22, a suitable resistance 23, to ground at 24.

The pressure controlled switch 21 is merely diagrammatically shown in the drawing and for purposes of clearer illustration is indicated as including a contact making member 25 acted upon by a spring 26 which tends to maintain the member 25 in circuit closing position. A piston 27 acting in a cylinder 28, the latter being supplied with air by the pipe 29 leading to the usual storage vessel into which the motor-compressor pumps the air, acts in opposition to the spring 26. Thus, should the pressure in the air system drop, due, for example, to the utilization of air in the air brake system, the spring 26 overcomes the decreased air pressure in the cylinder 28 and closes the circuit of the motor 19. As soon as the latter with its associated compressor has restored the air pressure to substantially normal value, the increased air pressure in the cylinder 28 overcomes the tension of the spring 26 and opens the circuit of the compressor motor 19. The switch 21 and hence the motor 19 will be intermittently operated, and likewise there will be effective across the resistance 23, during these periods of operation of the motor 19, a suitable voltage drop. The several parts are so proportioned with respect to the current drawn by the motor 19 that a relatively large fraction of the transmission line voltage will be utilized in driving the motor 19, while a relatively small fraction of this transmission line voltage will be present as a voltage drop across the resistance 23. This latter voltage drop is preferably of such magnitude as to permit effective charging of the storage battery 14 which is arranged in shunt relation to the resistance 23, as will be more clearly hereinafter described.

The storage battery 14 has one terminal thereof connected to one terminal of the resistance 23, as by the conductor 30; in this conductor 30 is inserted an automatic switch generally indicated at 31 adapted to complete the connection of this one terminal of the battery 14 to the one terminal of the resistance 23. The other terminal of the storage battery 14 is connected to the other terminal of the resistance 23 by means of conductor 32, a variable resistance 33, preferably taking the form of a compressible carbon pile, and conductor 34. Acting upon carbon pile 33 and at the unanchored or right hand end thereof is a bell crank lever 35 pivoted as at 36; this lever is acted upon by a spring 37 tending normally to maintain the carbon pile 33 under compression, thus to maintain its resistance at a relatively low or minimum value. At the left hand end of the bell crank lever 35 there is connected a solenoid core 38 acted upon by a winding or coil 39, the latter when energized acting through the core 38 to oppose the action of the spring 37 and to control the pressure exerted upon the pile 33 and hence to control the resistance of the latter. More particularly, the coil 39 is connected as by a conductor 40 and conductor 32 to one pole or terminal of the battery 14 and as by conductor 41, conductor 30 and automatic switch 31 to the other pole or terminal of the battery 14; in this manner, upon the closure of the automatic switch 31, the coil 39 may be made responsive to the voltage impressed upon the storage battery 14. But prior to the closure of the automatic switch 31 the coil 39 will be seen to be in a position to be affected by the voltage drop across the resistance 23.

The automatic switch 31 is diagrammatically indicated as taking the form of a circuit closing or bridging member 42 adapted to be controlled in its movement by suitable windings acting upon the core 43; these windings include preferably a voltage winding 44 connected substantially in parallel with the voltage coil 39. As soon as the circuit of the translating device or motor 19 is closed, thus to make effective a substantial voltage drop across the resistance 23, the coil 44 on the switch 31 becomes energized, raises core 43 and hence bridging member 42 into circuit closing position, thus connecting the storage battery 14 in shunt relation to the resistance 23. The resultant flow of charging current to the battery 14 through a current coil 45 on the automatic switch 31 is effective to produce in the coil 45 a magnetomotive force assisting that of the coil 44, the two coils thus acting to hold the switch 31 securely in closed position.

The closure of the switch 31 making the regulating coil 39 responsive to the voltage across the battery 14, as hereinabove noted, thereupon permits the voltage coil 39 to control the resistance of the variable resistance 33, and thus to control the division of current between the resistance 23 and the storage battery 14. Where the translating device 19 takes the form of a compressor motor, the load on the latter will be substantially constant and the current flow in the circuit of the motor will likewise be substantially constant; in this manner the battery 14 is effectively safeguarded against receiving a charging current of too high a value, and any tendency to force an excessive charging current through the battery 14 will be accompanied by a corresponding increase in voltage across the battery. Such an increase in voltage across the battery at once energizes the regulating coil 39 more strongly and causes the latter to increase the resistance of the carbon pile 33, and thus to decrease or maintain within a predetermined limit the flow of current to the battery 14.

Should the battery approach substantially full charge, the back E. M. F. of the battery 14 will be characterized by a substantial rise, this rise being accompanied by a corresponding rise in the voltage applied to the battery if the charge is to continue. But this rise in voltage at once affects the regulating coil 39 so that it increases the resistance of the carbon pile 33 to correspondingly cut down the flow of current in the battery circuit. In this manner the storage battery 14 may be dependably safeguarded against overcharge.

The closure of the circuit of the translating device 19, as by the switch 21, may be and often is accompanied by a substantial rush of starting current; such a rush of current would produce across the resistance 23 a temporary but relatively high voltage, which, if immediately applied to the battery 14, would tend to send through the battery 14 an abnormally high rush of charging current. To prevent this action from taking place immediately upon the closure of the automatic switch 31, the regulating coil 39 is, as hereinbefore noted, connected so that it will be responsive to the temporary high voltage across the resistance 23 prior to the closure of the switch 31. This temporary high voltage is thus permitted to increase the resistance of the carbon pile through the solenoid 38—39, so that when the automatic switch 31 actually closes, the circuit of the battery 14 will already have inserted in it (by way of the increased resistance of the carbon pile 33) a suitable resistance to prevent this high rush of charging current to the battery. Thus, it will be seen that the battery is also effectively safeguarded against even transient charging currents of abnormal value.

If at any time during the charge of the battery 14 or after the completion of the charge of the battery 14, the circuit of the translating device 19 be opened, thus to make ineffective the source 11 of charging current, the battery 14 would momentarily discharge through the resistance 23; this discharging current of the battery 14 produces a magnetomotive force in the current coil 45 of the automatic switch 33, which will be in opposition to that of the coil 44 of the switch, due to the reversal of current passing through the coil 45. The holding action of the coil 44 will thus be opposed and the switch 31 permitted to open.

As hereinbefore noted, the train line conductors 15$^a$—16$^a$ of an adjacent car will have connected thereto a storage battery such as is diagrammatically indicated at 14$^a$. Thus the train line will have connected to it as many storage batteries as there are cars or units in the train, and because of either differences in their states of charge or of differences in their characteristics, these storage batteries will tend to interact one upon the other through the train line to which they are connected. Particularly will such interaction take place where the battery of one car is of the lead type and the battery of another car is of the Edison type, the latter having a charging voltage characteristic materially higher than that of the lead type of battery. If two such batteries are under such conditions connected to the same train line, the battery of higher voltage will tend to discharge into the battery of lower voltage or the battery of lower voltage will tend to receive charging current from the charging circuit of the battery of higher voltage characteristic without the apparatus associated with the former being capable of guarding against undesired charging currents from other sources, such as the other sources connected to the train line. Accordingly, there has been provided in this invention apparatus capable of rugged construction and thoroughly dependable action for preventing such undesired and detrimental actions from taking place.

The battery 14 of the one car has one terminal thereof connected as by conductor 46 to the train line conductor 16; the other terminal of the battery 14 is connected to the other conductor 15 by way of conductor 47, coil 48 of an automatic switch generally indicated at 49, bridging member 50 of the switch 49 and conductor 51 (and thence to train line conductor 15). The switch member 50 of the switch 49 is normally held closed by coil 52 connected across the battery 14 as by the conductors 53 on the one hand and conductors 54—55 on the other, this coil 52 acting upon the core 56 of the switch 49 to hold the member 50 in good electrical contact with the two contacts of the switch. Current flowing from the battery 14 through the current coil 48 and to the train line 15—16 acts, by way of coil 48, to assist coil 52 and these two coils thus together maintain the bridging member 50 in secure electrical contact with the two contacts of the switch.

Should the voltage impressed upon the train line conductors 15—16, as by way of another source of current connected to these train line conductors, such as the battery 14$^a$, for example, be greater than the voltage of the battery 14, due, for example, to the battery 14$^a$ having a higher charging-voltage characteristic, the battery 14 will receive a charging current from the train line. This charging current flowing to the battery 14 and through the current coil 48 of the switch 49 reverses the action of the coil 48 and instead of assisting the coil 52 to hold the switch member 50 in closed position, opposes the action of coil 52 and causes the latter to permit the bridging member 50 to drop, thus disconnecting the battery 14 from the train line. By appropriately proportioning the coils and the weight of the moving parts of the switch 49, this opening of the switch 49 may be made to take place as soon as the charging current flowing to the battery 14 from the train line 15—16 reaches any desired value. As soon as the switch 49 has been opened coil 57, connected across the contacts of the switch 49, becomes energized; this coil 57 is wound so that, when the switch 49 is open, it will oppose the action of the coil 52, and will thus tend to prevent closure of the switch by coil 52 as long as the difference in potential between the train line conductors 15—16 and the battery 14 exists. As soon as the voltage of the train line approaches or equals the voltage of the battery 14, the coil 57 of the switch 49 becomes substantially deenergized, and permits the coil 52 to close the switch. In this manner the battery is effectively safeguarded from receiving charging current from undesired sources, and which charging current the protective apparatus associated with the battery 14 is otherwise incapable of guarding against. Where the train line has connected to it a storage battery of the Edison type, for example, (as at the battery 14$^a$), the charging-voltage characteristic of this battery is so materially higher than that of the lead type that, assuming the battery 14 to be of the lead type, the latter will receive substantial charging current from the charging circuit of the Edison type of battery.

In order to insure the battery 14 being maintained in properly charged condition throughout the various practical conditions to which the car or train is subjected in practice, means are provided for charging the battery 14 in case the car or train is laid up for such a length of time that the compressor motor 19 is either not operated at all or at such infrequent intervals that the battery 14 cannot receive its proper charge.

During such conditions of use of the vehicle or train, it is important that the signal lights, supplied with energy from the storage battery 14, be maintained in operation, and it is hence of importance to insure the proper charging of the battery 14 under such conditions of use of the vehicle. Accordingly, there is provided a relay generally indicated at 58, preferably of the solenoid type, having a core 59 upon which is operative a voltage responsive coil 60 connected to one terminal of the battery 14 by conductor 61 and to the other terminal of the battery 14 by conductors 62—55. As long as the battery 14 is in a state of charge other than that approaching substantially full discharge, coil 60 is effective to hold core 59 in upper position, and the latter being connected to the switch lever 63, pivoted as at 64, is effective to hold open the circuit of coil 65 which operates a switch generally indicated at 66 and adapted to close an auxiliary charging circuit. This auxiliary charging circuit includes current collecting device 13, conductor 67, resistance 68, blowout winding 69, bridging member 70 of switch 66 (when closed), conductor 71, coil 72 on the relay 58, conductor 73, conductor 30, thence through the battery 14, and by way of conductor 32, carbon pile 33 (now in a compressed state), conductor 34 to ground at 24. The action of coil 60 of switch 58 is opposed by a spring 74, and assuming that the circuit of the translating device 19 is unavailable for charging the battery 14, and assuming that the battery 14 approaches a state of substantial discharge, the voltage of the battery will be characterized by a somewhat abrupt drop. This drop substantially weakens the coil 60 of relay 58, and permits the spring 74 to close the circuit of the coil 65 of switch 66. The circuit of coil 65 of switch 66, when thus closed, will be seen to be from one terminal of the battery 14, by way of conductor 55, conductor 75 to the fixed contact of relay 58, thence via switching member 63 of the relay 58, conductor 76 to coil 65; and from the latter by way of conductor 77′, and conductors 73—30, to the other terminal of the battery 14.

The energization of coil 65 of switch 66 closes the auxiliary charging circuit, and the resultant flow of current to the battery through current coil 72 of relay 58 is made effective to oppose the action of coil 60 of relay 58, thus permitting the spring 74 to maintain a good electrical contact in the circuit of the coil 65 of switch 66. As the charging of the battery 14 proceeds, and as the battery approaches substantially full charge, the voltage of the battery is characterized by a material rise, this rise in voltage strengthening the coil 60 of relay 58; at the same time the increasing or rising back E. M. F. of the battery 14 acts to decrease the charging current, thus weakening the action of current coil 72 (of relay 58) in opposing coil 60. At substantially the completion of the charge of the battery 14 through this auxiliary circuit, the coil 60 will have been sufficiently strengthened and the current coil sufficiently weakened so that the core 59 of relay 58 is raised and the circuit of coil 65 of switch 66 broken. Switch 66 at once opens, any tendency to produce arcing at the contacts of the switch 66 being counteracted by the magnetic field produced by the blowout coil 69.

Should the auxiliary charging circuit be in operation and the compressor motor circuit be made effective, thus making available the first above described charging circuit for the battery 14, a coil 77 on the relay 58 becomes energized; this coil 77 is connected by conductors 78—30 and conductor 79 substantially across the resistance 23 in the main charging circuit, and when energized, due to the flow of current through the resistance 23 in the motor circuit, assists coil 60, and thus makes the relay 58 effective to open the circuit of the coil 65 of switch 66, thus interrupting the auxiliary charging circuit. As long as the compressor motor circuit is available for charging the battery 14, the coil 77 on relay 58 will remain energizing to prevent the closure of the auxiliary charging circuit; on the other hand, should the main charging circuit be made ineffective and the battery 14 require charging, the coil 77 will remain de-energized to permit the actuation of relay 58 under the control of coil 60, as hereinabove described.

It will thus be seen that the battery may be dependably maintained in proper state of charge throughout the varying conditions of use to which the vehicle or train is subjected in practice, and that thus the battery is maintained at all times in appropriate condition for supplying energy to the various auxiliary devices on the vehicle or train. More particularly, it will be seen that the apparatus provided is of thoroughly positive and dependable action throughout, and is of such character as is well adapted to meet the hard conditions of practical use.

As many possible embodiments may be made of the above invention, and as many changes might be made in the embodiment above set forth, it is to be understood that all matter hereinbefore set forth is to be interpreted as illustrative and not in a limiting sense.

I claim as my invention:

1. In apparatus of the character described, in combination, a source of current connected to a circuit having included therein a resistance, a storage battery adapted to be connected across said resistance to receive charging current from said source, a variable resistance interposed between said resistance and said storage battery and adapted normally to be maintained at substantially minimum value, switching means for connecting said battery to said first-mentioned resistance, and a voltage coil for controlling said variable resistance connected to be responsive to substantially battery voltage after the closure of said switching means but responsive substantially to the voltage drop across said first-mentioned resistance prior to the closure of said switching means.

2. In apparatus of the character described, in combination, a storage battery adapted to be connected to a load circuit having therein another source of current, a switch for controlling the connection of said storage battery to said load circuit, means for controlling said switch comprising a coil energized by said battery and capable, at all normal voltages of said battery, of closing said switch, a coil responsive to current flowing in the circuit between said battery and said load circuit, said current responsive coil assisting said first-mentioned coil when said battery discharges into said load circuit and opposing said first-mentioned coil when current flows to said battery from said load circuit, thereby to open said switch, and means effective after the opening of said switch for holding said switch open as long as the voltage of said load circuit substantially exceeds the voltage of said battery.

3. In apparatus of the character described, in combination, a storage battery adapted to be connected to a load circuit having therein another source of current, a switch for controlling the connection of said storage battery to said load circuit, means for controlling said switch comprising a coil energized by said battery and capable, at all normal voltages of said battery, of closing said switch, a coil responsive to current flowing in the circuit between said battery and said load circuit, said current responsive coil assisting said first-mentioned coil when said battery discharges into said load circuit, thereby to maintain said switch closed and opposing said first-mentioned coil when current flows to said battery from said load circuit, thereby to open said switch, and a coil connected across the contacts of said switch and acting when energized upon opening of said switch, by current flowing from said source to said battery, to oppose said first-mentioned coil, thereby to hold said switch open.

4. In apparatus of the character described, in combination, a plurality of vehicles, a train line passing through the vehicles, a storage battery carried by one of said vehicles, a storage battery carried by another of said vehicles, means connecting one of said storage batteries to said train line, and means connecting the other storage battery to said train line, said last-mentioned means comprising a switch, electromagnetic means energized by said battery for holding said switch in closed position as long as the voltage of said battery exceeds that of the train line and operative to open said switch when the voltage of said train line exceeds that of said battery.

5. In apparatus of the character described, in combination, a plurality of vehicles, a train line passing through the vehicles, a storage battery carried by one of said vehicles, a storage battery carried by another of said vehicles, means for charging one of said batteries including a resistance adapted to be energized by a suitable source and about which said battery is shunted, means connecting one of said storage batteries to said train line, and means connecting the other storage battery to said train line, said last-mentioned means comprising a switch, and electromagnetic means energized by said battery for holding said switch in closed position as long as the voltage of said battery exceeds that of the train line and operative to open said switch when the voltage of said train line exceeds that of said battery, thereby to prevent said other battery from discharging into said shunt resistance.

6. In apparatus of the character described, in combination, a storage battery adapted to be connected to a load circuit having therein another source of current, a switch for controlling the connection of said battery to said load circuit, electromagnetic means for closing said switch when the voltage of said battery exceeds the voltage of said source and for opening said switch when the voltage of said source exceeds the voltage of said battery, and means effective when the voltage of said source exceeds that of said battery for opposing the action of said electromagnetic means in tending to close said switch.

7. In apparatus of the character described, in combination, a source of current connected to a circuit having included therein a resistance and a translating device in series with said resistance and through which resistance current to said translating device flows; a storage battery shunted about said resistance; a variable resistance included in said shunt circuit; switching means having a voltage responsive coil connected in series with said variable resistance across said first-mentioned resistance and adapted upon a voltage appropriate for charging the battery to close said shunt circuit; means tending normally to cause said variable resistance to assume a minimum value; and means responsive to a function of the current flowing to said battery for opposing said last-mentioned means and for controlling the value of said variable resistance during charging of the battery.

8. In apparatus of the character described, in combination, a source of current connected to a circuit having included therein a resistance and a translating device in series with said resistance and through which resistance current to said translating device flows; a storage battery shunted about said resistance; switching means for closing said shunt circuit upon the voltage across said resistance being sufficient for charging the battery and for opening said shunt circuit upon said voltage becoming insufficient for charging of the battery; and a variable resistance in said shunt circuit having associated therewith means responsive to a function of the current flowing to the battery for controlling the value of said variable resistance, whereby the ohmic resistance in series with said translating device is prevented from exceeding the ohmic resistance of said first-mentioned resistance.

In testimony whereof, I have signed my name to this specification this 15th day of January, 1925.

LOUIS VON OHLSEN.